United States Patent
Schombourg

(10) Patent No.: US 9,624,364 B2
(45) Date of Patent: Apr. 18, 2017

(54) SILANE VULCANIZED THERMOPLASTIC ELASTOMERS

(71) Applicant: Falcone Specialties AG, Regensdorf (CH)

(72) Inventor: Jacques Schombourg, Regensdorf (CH)

(73) Assignee: Falcone Specialties AG, Regensdorf (CH)

( * ) Notice: Subject to any disclaimer, the term of this patent is extended or adjusted under 35 U.S.C. 154(b) by 0 days.

(21) Appl. No.: 15/106,323

(22) PCT Filed: May 4, 2015

(86) PCT No.: PCT/CH2015/000073
§ 371 (c)(1),
(2) Date: Jun. 20, 2016

(87) PCT Pub. No.: WO2015/168816
PCT Pub. Date: Nov. 12, 2015

(65) Prior Publication Data
US 2016/0319117 A1    Nov. 3, 2016

(30) Foreign Application Priority Data

May 7, 2014   (EP) .................... 14001615

(51) Int. Cl.
| | | |
|---|---|---|
| *C08L 23/06* | (2006.01) | |
| *C08K 5/00* | (2006.01) | |
| *C08K 5/54* | (2006.01) | |
| *C08L 23/08* | (2006.01) | |
| *C08L 9/02* | (2006.01) | |
| *C08L 23/16* | (2006.01) | |

(52) U.S. Cl.
CPC .............. *C08L 23/06* (2013.01); *C08K 5/00* (2013.01); *C08K 5/54* (2013.01); *C08L 9/02* (2013.01); *C08L 23/083* (2013.01); *C08L 23/16* (2013.01); *C08L 2205/02* (2013.01); *C08L 2207/064* (2013.01); *C08L 2312/08* (2013.01)

(58) Field of Classification Search
CPC .. C08L 23/06; C08L 9/02; C08L 23/16; C08L 2205/02; C08L 2207/064; C08L 2312/08
See application file for complete search history.

(56) References Cited

U.S. PATENT DOCUMENTS

| | | | |
|---|---|---|---|
| 2003/0035974 A1* | 2/2003 | Kazuno et al. ... | B29C 45/14778 428/517 |
| 2005/0032981 A1* | 2/2005 | Yu et al. ................ | B60C 1/00 525/191 |
| 2006/0235156 A1 | 10/2006 | Griswold et al. | |

FOREIGN PATENT DOCUMENTS

WO    9967330  A1    12/1999

OTHER PUBLICATIONS

International Search Report for corresponding International Application No. PCT/CH2015/000073 mailed Jul. 22, 2015.
Written Opinion of the International Searching Authority for corresponding International Application No. PCT/CH2015/000073 mailed Jul. 22, 2015.

* cited by examiner

*Primary Examiner* — Nathan M Nutter
(74) *Attorney, Agent, or Firm* — Renner, Otto, Boisselle & Sklar, LLP

(57) ABSTRACT

The present invention relates to novel polymer compositions, particularly in the form of thermoplastic Vulcanisates, said compositions comprising the reaction product of a first polymer (rubber phase); a second polymer (thermoplastic phase); a carboxylic acid anhydride; either a vinylsilane in combination with a peroxide or a sulphursilane; and whereby said silane is allowed to react with the polymers first. The invention further provides for processes of manufacturing such compositions and for articles comprising such compositions.

16 Claims, No Drawings

SILANE VULCANIZED THERMOPLASTIC ELASTOMERS

This application is a national phase of International Application No. PCT/CH2015/000073 filed May 5, 2015, and claims priority to Application No. EP 14001615.5 filed May 7, 2014.

The present invention relates to novel polymer compositions, particularly in the form of thermoplastic Vulcanisates, to processes for manufacturing such compositions, to articles comprising such compositions.

Thermoplastic elastomers (TPE) are known materials; they exhibit the functional properties of conventional thermoset rubbers, yet they can be melted repeatedly and are therefore suitable for processing in conventional thermoplastic fabrication equipment. The majority of TPE consist of two phases, one consisting of a rubber phase (elastomer) that is insoluble in the other, and a flowable thermoplastic phase. The rubber phase is present as a dispersed phase and the thermoplastic is the continuous phase.

Although it is in principle not necessary to cross-link the rubber in a TPE, it has proven efficient using cross-linking techniques to obtain better thermal and chemical resistance, mechanical properties and a better control of phase separation. Such TPE compositions where a cross-linking reaction and process is used to achieve phase separation into divided domains are called Thermoplastic Vulcanizates (TPV). To keep their thermoplastic character, it is essential that only the rubber phase be cross-linked. EP1021486 describes such TPVs, cross-linked with specific aminosilane derivatives.

Although suitable for a number of applications, known TPVs show a number of drawbacks, making them unsuitable for specific applications. For example, transparency of the materials is lacking, excluding a number of applications. Further, the starting materials used are often not "food grade", again preventing a number of applications. Also, depending on the starting materials, chemical resistance, such as oil resistance, is not satisfactory, again preventing a number of applications. As a consequence, there is a need for further TPVs overcoming one or more of the above drawbacks.

It is further considered disadvantageous that known manufacturing methods for TPVs are difficult to control. Consequently, it is an object of the present invention is to provide improved manufacturing methods that are simple to control.

These objectives are achieved by proving the composition of claim 1 and by the process of claim 12. Further aspects of the invention are disclosed in the specification and independent claims, preferred embodiments are disclosed in the specification and the dependent claims.

The present invention will be described in more detail below. It is understood that the various embodiments, preferences and ranges as provided/disclosed in this specification may be combined at will. Further, depending of the specific embodiment, selected definitions, embodiments or ranges may not apply. As used herein, the term "a", "an", "the" and similar terms used in the context of the present invention (especially in the context of the claims) are to be construed to cover both the singular and plural unless otherwise indicated herein or clearly contradicted by the context. As used herein, the terms "including", "containing" and "comprising" are used herein in their open, non-limiting sense.

In more general terms, in a first aspect, the invention relates to a composition comprising the reaction product of (a) a first polymer (rubber phase); (b) a second polymer (thermoplastic phase); (c) a carboxylic acid anhydride; (d) either (d1) a vinylsilane in combination with a peroxide or (d2) a sulphursilane; and whereby component (d) is allowed to react with the polymers first. These compositions typically show properties of thermoplastic vulcanisates (TPVs). As further outlined below, the inventive compositions show beneficial properties as they (i) consist of food grade starting materials and/or (ii) are transparent and/or (iii) are oil resistant. These properties allow new applications and/or provide improvements in known applications. This aspect of the invention shall be explained in further detail below:

TPV:

TPVs are a known class of polymeric compounds and belong to the group of thermoplastic elastomers. The molecular structure of TPVs is complex and characterized by the presence of two separate phases, namely a rubber phase and a thermoplastic phase. The rubber phase is further cross-linked (vulcanized). This combination of two phases and cross-linking of the rubber phase is considered crucial for the beneficial thermoplastic and elastomeric properties of TPVs. Cross-linking is achieved either by addition of component (d1) or of component (d2), to the polymer melt, and prior to addition of component (c) as further outlined below. The invention thus relates to a composition as described herein, which is a TPV.

Component (a), Rubber Phase: A broad range of polymers may be used as component (a); a person skilled in the art is in a position identifying suitable materials.

The polymer which is to become the rubber phase must be extrudable and should be capable of grafting with component (d).

Suitable components (a) are any polymers which react with component (d) and include ethylene propylene copolymer (EPR); ethylene propylene diene terpolymer (EPOM); butyl rubber (BR); natural rubber (PR); chlorinated polythylenes (CPE); silicone rubber; isoprene rubber (IR); butadiene rubber (BR); styrene-butadiene rubber (SBR); ethylene-vinyl acetate (EVA); ethylene butylacrylate (EBA), ethylene methacrylate (EMA), ethylene ethylacrylate (EEA), ethylene-a-olefin copolymers (e.g., EXACT and ENGAGE, LLDPE (linear low density polyethylene)), high density polyethylene (HDPE) and nitrile rubber (NBR). Polypropylene was found unsuitable, as practical impossible to graft sufficient silane(s) onto such polymer. Preferably, the polymer is an ethylene polymer or copolymer with at least 50% ethylene content (by monomer), more preferably at least 70% of the monomers are ethylene. The amount of component (a) to may vary over a broad range. Suitable amounts include the range of 50 to 90 wt %, preferably 70 to 80 wt %, based on the total amount of polymer present.

Component (b), Thermoplastic phase: A broad range of polymers may be used as component (b); a person skilled in the art is in a position identifying suitable materials.

Preferably, the melting point of the thermoplastic phase is less than the decomposition temperature of the silane (d), as well as the decomposition temperature of the acid anhydride.

Suitable components (b) are polypropylene (PP); polyethylene, especially high density (HDPE); polystyrene (PS); acrylonitrile butadiene styrene (ABS); styrene acrylonitrile (SAN); polymethylmethacrylate (PMMA); thermoplastic polyesters (PET, PBT); polycarbonate (PC); and polyamide (PA).

The amount of component (b) to may vary over a broad range. Suitable amounts include the range of 5 to 40 wt %, preferably 15 to 30 wt %, based on the total amount of polymer present.

Polymers, component (a) and (b): The above polymers are known per se and may be made by any processes known in the art, including, but not limited to, by bulk phase, slurry phase, gas phase, solvent phase, interfacial polymerization (radical, ionic, metal initiated (e.g. metallocene, Ziegler-Natta)), polycondensation, poly-addition or combinations of these methodologies.

The polymers may have unimodal, bimodal or multimodal molecular weight distributions. The melt flow of the polymers may be any of those known in the art for use in forming thermoplastics and rubbers.

Although not necessary, it is preferred that component (a) and (b) are different polymers.

Component (c), Carboxylic Acid anhydride: A broad range of anhydrides may be used as component (c); a person skilled in the art is in a position identifying suitable materials. Suitable carboxylic acid anhydrides can be grafted onto the polymer to be the rubber phase by any possible mechanism. It is preferable, that there be an unsaturation either in the polymer, or more preferably, in the acid anhydride, to accomplish this grafting. The unsaturation of the carboxylic acid anhydride may be internal or external to a ring structure, if present, so long as it allows for reaction with the polymer. The acid anhydride may include halides. Mixtures of different carboxylic acid anhydrides may be used. Exemplary unsaturated carboxylic acid anhydrides may be selected from the group consisting of isobutenylsuccinic, (+/−)-2-octen-1-ylsuccinic, itaconic, 2-dodecen-1-ylsuccinic, cis-1,2,3,6-tetrahydrophthalic, cis-5-norbornene-endo-2,3-dicarboxylic, endo-bicyclo [2.2.2]oct-5-ene-2,3-dicarboxylic, methyl-5-norbornene-2,3-carboxylic, 3,6-tetrahydrophthalic, maleic, citraconic, 2,3 dimethylmaleic, 1-cyclopentene-1,2-dicarboxylic, 3,4,5,6-tetrahydrophthalic, bromomaleic, and dichloromaleic anhydrides.

The amount of component (c) to may vary over a broad range. Suitable amounts include the range of 0.01 to 1.0 wt %, based on the total amount of polymer present.

Component (d1), vinylsilane in combination with a peroxide: According to this invention, vinylsilanes are used in combination with a peroxide; component (d1) therefore comprises two constituents. A broad range of vinylsilanes may be used as component (d1); a person skilled in the art is in a position identifying suitable materials. Suitable vinylsilanes include vinyl-tris($C_{1-4}$alkoxy)silanes and vinyl-($C_{1-4}$alkxl)-bis($C_{1-4}$alkoxy)silanes, such as vinyltrimethoxysilane, vinyl-triethoxysilane, vinyl-tris-(2-methoxyethoxy)silane, vinyl-methyl-dimethoxysilane.

Further, a broad range of free radical generators (particularly peroxides), may be used as component (d1); a person skilled in the art is in a position identifying suitable materials. A free radical generator would be required for the grafting of the vinylsilane by a free radical mechanism onto the polymer but it is not required if the vinylsilane is either grafted via another mechanism or being a co-monomer of the polymer for example silane copolymer. Suitable free-radical catalysts may be selected from the group of water soluble or oil soluble peroxides. Examples of suitable peroxides may be selected from the group consisting of hydrogen peroxide, persulfates (e.g. ammonium persulfate, potassium persulfate); azo compounds (e.g. 2-azobis(isobutyronitrile); dialkyl peroxides (e.g. 2.5-Dimethyl 2.5-di (tert.butylperoxy) peroxide (DHBP), diisopropyl peroxide, dilauryl peroxide, di-t-butyl peroxide, di(2-t-butylper-oxyisopropyl)-benzene; 3,3,5-trimethyl-1,1-di(tert-butyl peroxy)-cyclohexane; 2,5-dimethyl-2,5-di(t-butylperoxy) hexane, 2,5-dimethyl-2,5-di(t-butylperoxy)hexyne-3; dicumyl-peroxide); alkyl hydrogen peroxides (e.g. t-butyl hydrogen peroxide. t-amyl hydrogen peroxide, cumyl hydrogen peroxide); acyl peroxides (e.g. acetyl peroxide, lauryl peroxide, benzoyl peroxide); peroxy esters (e.g. ethyl peroxybenzoate). Particularly suitable peroxides include DHBP and similar organic peroxides.

The free radical generator may be present at 1/100 to 1/1 based on the molar quantity of the vinylsilane.

The amount of component (d1) to may vary over a broad range. Suitable amounts include the range of 0.1 to 5 wt %, preferably 1.0 wt %, based on the total amount of polymer present. The ratio vinylsilane:peroxide may vary over a broad range. Suitable amount include the range of 1:50 to 1:1 wt %, preferably 1:20 wt %.

It was found that the inventive compositions, cross-linked with component (d1) are transparent, odorless and/or consist of food grade starting materials, allowing application in food industry, pharmaceutical industry, packaging and the like.

Component (d2), sulphursilane: A broad range of sulphur-silanes may be used as component (d2); a person skilled in the art is in a position identifying suitable materials. Suitable sulphursilanes include Mercaptos-silanes and tris-alkoxysilyl-alkylpolysulfanes, such as bis(triethoxy-silylpropyl)-polysulfane, gamma-mercaptopropyl-trimethoxysilane, gamma-mercaptopropyl-triethoxysilane, bis-(Triethoxysilylpropyl)-tetrasulfide, bis-(disulfide-triethoxysilylpropyl).

It was found that the inventive compositions, cross-linked with component (d2) are particularly oil resistant, allowing application in automotive industry, chemical industry, aviation and the like.

The above silanes (d1), (d2) should be present at 250 to 25,000 ppm based on weight of both polymers. It should also be present at a molar equivalency ratio to the acid anhydride of about 0.1 to 10, more preferably 0.9 to 1.1, most preferably, about a 1:1 ratio.

Optional Components (e), additives: Standard additives such as stabilizers (LTV, light or aging), antioxidants, metal deactivators, processing aids, waxes, fillers (silica, $TiO_2$, $CaCO_3$, $Mg(OH)_2$, carbon black, etc.), and colorants may be added to the inventive compositions.

Additionally, blowing agents may be added to the compositions so that when they are extruded the polymer will form a foam. Examples of such blowing agents are volatile hydrocarbons, hydrofluorocarbons, and florofluorocarbons. Commonly known foaming agents like azocarbonamide or sodium bicarbonate (aka sodium hydrogen carbonate) decompose at elevated temperature to yield gaseous products. These are all chemical foaming processes. Foams can also be produced by injection of liquid or gaseous foaming agent into the polymer melt. Examples are, e.g., butane, CO, nitrogen, water, helium, etc. The amount of such a blowing agent should be at 0.1 to 50 weight percent of the polymers.

It was found that component (d1) is generally applicable to vinylsilanes, in combination with carboxylic acid anhydrides or grafted carboxylic acid anhydrides onto polymers, copolymers or elastomers and radical generators. Particularly suitable components (a) include EPR, EPDM, BR, NR, CPE, IR, Silicone rubber, chlorinated rubbers, SBR, NBR, EVA, EMA, EBA, EEA, LDPE, MDPE, HDPE, VLDPE, UVLDPE. Particularly suitable components (b) include polypropylene and its copolymers, TPO's, Hifax TPO's, polyethylene and its copolymers, silane copolymers, PS, ABS, SAN, PMMA, PET, PBT, PC and PA. Thus, in an advantageous embodiment, the invention relates to compositions as described herein, wherein component (d) is selected from (d1), (a) is selected from the group consisting of EPR, EPDM, BR, NR, CPE, IR, Silicone rubber, chlorinated rubbers, SBR, NBR, EVA, EMA, EBA, EEA, LDPE, MDPE, HDPE, VLDPE, UVLDPE and (b) is selected from the group consisting of polypropylene and its copolymers, TPO's, Hifax TPO's, polyethylene and its copolymers, silane copolymers, PS, ABS, SAN, PMMA, PET, PBT, PC and PA.

It was found also that component (d2) is generally applicable to sulphursilanes, in combination with carboxylic acid anhydrides or grafted carboxylic acid anhydrides onto polymers, copolymers or elastomers and radical generators. Particularly suitable components (a) include EPR, EPDM, BR, NR, CPE, IR, SBR, NBR, chlorinated rubbers and PVC. Particularly suitable components (b) include polypropylene and its copolymers, polyethylene and its copolymers, PS, ABS, SAN, PMMA, PET, PBT, PC and PA. Thus, in an advantageous embodiment, the invention relates to compositions as described herein, wherein component (d) is selected from (d2), (a) is selected from the group consisting of EPR, EPDM, BR, NR, CPE, IR, SBR, NBR, chlorinated rubbers and PVC; and (b) is selected from the group consisting of include polypropylene and its copolymers, polyethylene and its copolymers, PS, ABS, SAN, PMMA, PET, PBT, PC and PA.

In an advantageous embodiment, the invention provides for a composition as described herein, wherein component (a) is Polyethylene, particularly LDPE or VLDPE, or an Ethylene-Propylen-Diene-Rubber (EPDM).

In an advantageous embodiment, the invention provides for a composition as described herein, wherein component (b) is a Polypropylene.

In an advantageous embodiment, the invention provides for a composition as described herein, wherein component (c) is maleic anhydride.

In an advantageous embodiment, the invention provides for a composition as described herein, wherein component (d1) is vinyltrimethoxysilane in combination with DHBP.

In an advantageous embodiment, the invention provides for a composition as described herein, wherein component (d2) is Bis(triethoxysilylpropyl)polysulfide.

The composition according to any of the preceding claims, wherein
  the gel content is between 5 to 50 wt %, most preferably 5 to 40 wt %; and/or
  the tensile strength is 3 to 40 MPa; and/or
  the elongation break is 100 to 1500%; and/or
  the melt index is 0.1 to 20 g/10 min at 190° C./5 kg; and/or
  the shore hardness is 20 to 80 D.

Properties: The inventive compositions show excellent mechanical properties. They have a significant gel content and a much lower MFI than the starting polymers, thereby improving creep resistance, tensile strength at break and hardness. Further, the compositions obtained have elastic properties (i.e., elongation at break of greater than 400%), but can be melt processed with methods normally known in the art for thermoplastics. The tensile and flexible moduli in the machine and transverse directions are improved, as is the dart impact strength of the material. The inventive compositions are transparent, particularly when component (d1) is used. The inventive compositions show good chemical resistance (including oil resistance), particularly when component (d2) is used.

In a second aspect, the invention relates to a process for manufacturing a composition as described herein, particularly to the manufacturing of TPVs as described herein. This aspect of the invention shall be explained in further detail below:

As outlined above, TPV have a complex structure on the molecular level. To obtain such structures, the components forming such TPVs have to be reacted in a specific manner.

Although such methods are known per se, they were not yet applied to the stating materials as described herein and not in the reaction sequence as described herein. Particularly, the prior art suggests adding a carboxylic acid anhydride to a polymer melt (comprising either or both of rubber phase and thermoplastic phase), followed by the addition of a silane compound.

Cross-Linking:

The inventive process reverses these steps by first adding silane compound (d) as defined herein to a polymer melt (comprising either or both of rubber phase and thermoplastic phase (a) and (b)), followed by the addition of a carboxylic anhydride (c). Obviously, this reversed sequence of addition provides TPVs having a different molecular structure.

Specifically, in a first reaction step, the silane compound (d) reacts with either or both of polymer (a)/(b). The reactions involved are complex and depend on the specific reaction conditions and starting materials. Generally, silane compound (d) may be grafted onto polymer (a)/(b) and/or may be copolymerized into the polymer (a)/(b). Further, reaction with either of polymer (a) or (b) may be favoured. To properly reflect this complex situation, the wording "is allowed to react with the polymers first" was chosen.

In a second reaction step, the thus obtained material is reacted with a carboxylic acid anhydride.

It was found that the mechanical performance of the inventive TPVs improves with the degree of cross-linking of the rubbery phase and with the inverse of the particle size of rubbery domains. Preferably, dynamic cross-linking is used to generate a finely dispersed, highly cross-linked rubbery phase (a) from a homogeneous blend of polymers. Dynamic cross-linking is known in the field and comprises the steps of intimately mixing a blend of polymers as described herein, then introducing a cross-linking system (d1) or (d2) and subsequently (c) in the mixture while the mixing process is continued. For thermodynamic and hydrodynamic reasons it is preferred that the polymer viscosity be increased while cross-linking is taking place, because the particles tend to agglomerate while the phases are separating. Moreover, if a phase-inversion process can take place while cross-linking, this is favorable to the formation of fibrous rubber domains which may provide specific mechanical properties. However, it has been found preferable to select a cross-linking mechanism that can involve in part the thermoplastic phase, not to the point where the thermoplastic character of the TPV is removed, but only to achieve better adhesion and compatibility of the polymers.

The selection of a cross-linking process and chemicals is governed by processing requirements, e.g., reaction rate at the processing temperature: compatibility with the elastomer; side reactions with the thermoplastic; efficiency (number of cross-links generated by each molecule of cross-linker); absence of undesired reactions; toxicity and hazards; color; and odor.

Method A, suitable for peroxide curable compositions: In one embodiment, the invention provides a process for manufacturing a peroxide curable composition as described herein, said process comprising the steps of:
  proving a homogeneous mixture of components (a) and (b), and then
  adding component (d1), either simultaneously or subsequently and then
  adding component (c).

In this method, it was found advantageous to add the vinylsilane first, followed by addition of the peroxide.

Method B, suitable for sulphur curable compositions: In a further embodiment, the invention provides a process for manufacturing a composition as described herein, said process comprising the steps of component (d2 is used
- proving a homogeneous mixture of components (a) and (b) and then
- adding component (d2), and then
- adding component (c).

The individual reaction steps are known per se. Suitable reaction times and temperatures depend on the starting materials and the equipment used. A person skilled in the art is in a position to define suitable parameters.

By following this manufacturing process, compositions according to this invention are obtained, said compositions showing properties of TPVs. The manufacturing process is simple to control and does not require specific equipment.

In a third aspect, the invention relates to the use of the compositions as described herein and to articles comprising the compositions as described herein. This aspect of the invention shall be explained in further detail below:

As outlined above, the inventive compositions possess known properties of classical TPVs and additional beneficial properties, thus allowing applications in the known fields of TPVs and additional innovative applications, not yet applied to TPVs.

Known properties of TPVs include tensile strength, elongation, melt index and shore hardness as outlined herein. These properties allow classical applications, for example in automotive industry.

Unknown properties of the present TPVs relate to the starting materials used and to optical properties available. The starting materials of the inventive compositions may be of "food grade", allowing applications in food industry and pharmaceutical industry not yet available for TPVs. The inventive compositions may have a transparent appearance, again allowing applications in food industry, pharmaceutical industry, and/or packaging not yet available for TPVs.

Accordingly, the invention also provides for the use of a composition as described herein the field of
- automotive industry,
- aircraft industry,
- food industry,
- pharmaceutical industry,
- packaging,
- consumer products; and/or
- electric power cables As a consequence, the invention also relates to articles or devices containing (i.e. comprising or consisting of) a composition as described herein, said article being selected from the group of
- automotive devices;
- aircrafts devices;
- healthcare devices;
- manufacturing equipment, particularly for food industry and pharmaceutical industry;
- packaging materials;
- tools for gardening, home and mechanical devices;
- low, medium and high voltage power cables.

TPVs as described herein are particularly suited for article selected from the group of automotive devices and insulations of electric power cables.

TPVs as described herein are also suited for adhesives and sealants, for articles selected from the group of pipes, profiles, molded parts, foamed parts, sheet-like articles, building and constructions, healthcare and household.

To further illustrate the invention, the following examples are provided. These examples are provided with no intend to limit the scope of the invention. As outlined below in further detail, example 1 relates to compositions comprising (d1) vinylsilanes in combination with a peroxide while example 2 relates to compositions comprising (d2) sulfursilanes.

EXAMPLE 1

Silane Thermoplastic Vulcanised Elastomers, Peroxide Curable

The experiments were carried out on a Brabender Plasticorder having a mixing chamber from 50 CC and equipped with "Sigma" mixing knives. The setting temperature was 190° C. and mixing speed used was 120 RPM.

EXAMPLE 1.1

| Ingredient | component | % |
|---|---|---|
| Engage ™ 8452 VLDPE ex DOW Chemical Melt Index 3 gr/10 min density 0.875 g/cm³ | rubber phase (a) | 75.00 |
| Eltex ™ P HF 100 Polypropylene homopolymer ex Solvay Melt index 0.9 gr/10 min density 0.900 g/cm³ | thermopl. phase (b) | 22.50 |
| DHBP ex Degussa | (d1) | 0.05 |
| Vinyltrimethoxysilane | (d1) | 1.50 |
| Maleic Anhydride | anhydride (c) | 0.95 |

The total amount of ingredients will be 50 gr by weighted according the example 1.1. Engage™ 8452 (very low density polyethylene (VLDPE) and Eltex™ P HF 100 polypropylene homopolymer are introduced in the mixing chamber and mixed until homogenisation. Vinyltrimethoxysilane/DHBP mixture are injected in the mixing chamber, after 5 minutes grafting/compounding time the Brabender Torque reached a value from 5 Nm. Maleic Anhydride is added in the mixing chamber, compounding time 10 minutes. The Brabender Torque value increased to 12 Nm after 7 minutes and dropped at 6 Nm after 10 minutes, which indicated that, the cross-linking reaction has taken place. A moulded specimen, 1.5 mm thickness, is pressed at 210° C./20 Bars, having the following characteristics:

| Physical Property | Method | Unit | Value |
|---|---|---|---|
| Tensile strength at break | ISO 37 [1] | [MPa] | 28 |
| Elongation at break | ISO 37 [1] | [%] | 820 |
| Melt Index (190° C./5 kg) | ISO 1872-1, No 18T | [g/10 min] | 2.0 |
| Shore hardness A | ISO 868 | — | 86 |
| Gel content | ISO 6427 | [%] | 36 |

[1] 50 mm/min pulling speed

The above data show, that this specimen shows characteristics of a TPV. Further, the specimen is transparent and odourless.

EXAMPLE 1.2

Comparison

| Ingredient | component | % |
| --- | --- | --- |
| Engage ™ 8452 | rubber phase (a) | 75.00 |
| Eltex ™ P HF 100 | thermopl. phase (b) | 22.50 |
| DHBP | (d1) | — |
| Vinyltrimethoxysilane | (d1) | — |
| Maleic Anhydride | anhydride (c) | 1.00 |

The total amount of ingredients will be 50 gr by weighted according the example 1.1. Engage 8452 and Eltex P HF 100 are introduced in the mixing chamber and mixed until homogenisation. After 5 minutes grafting/compounding time the Brabender Torque reached a value from 6 Nm. Maleic Anhydride is added in the mixing chamber, compounding time 10 minutes. The Brabender Torque value increased to 6 Nm after 6 minutes and remains at 5 Nm, which indicated that, no cross-linking reaction has taken place. A moulded specimen, 1.5 mm thickness, is pressed at 210° C./20 Bars, having the following characteristics:

| Physical Property | Method | Unit | Value |
| --- | --- | --- | --- |
| Tensile strength at break | ISO 37 [1] | [MPa] | 13 |
| Elongation at break | ISO 37 [1] | [%] | 800 |
| Melt Index (190° C./5 kg) | ISO 1872-1, No 18T | [g/10 min] | 8.5 |
| Shore hardness A | ISO 868 | — | 82 |
| Gel content | ISO 6427 | [%] | 0 |

[1] 50 mm/min pulling speed

The above data show, that this specimen shows NOT characteristics of a TPV. Further, the specimen is transparent and odourless.

EXAMPLE 1.3

| Ingredient | component | % |
| --- | --- | --- |
| Engage ™ 8842 UVLDPE ex DOW Chemical Melt index 1 gr/10 min density 0.857 g/cm³ | rubber phase (a) | 75.00 |
| Eltex ™ P HF 100 | thermopl. phase (b) | 22.50 |
| DHBP | (d1) | 0.05 |
| Vinyltrimethoxysilane | (d1) | 1.45 |
| Maleic Anhydride | anhydride (c) | 1.00 |

The total amount of ingredients will be 50 gr by weighted according the example 1.1. Exact 8842 and Eltex P HF 100 are introduced in the mixing chamber and mixed until homogenisation. Vinyltrimethoxysilane/DHBP mixture are injected in the mixing chamber, after 5 minutes grafting/compounding time the Brabender Torque reached a value from 6 Nm. Maleic Anhydride is added in the mixing chamber, compounding time 10 minutes. The Brabender Torque value increased to 13 Nm after 6 minutes and dropped at 6 Nm, which indicated that, the cross-linking reaction has taken place. A moulded specimen, 1.5 mm thickness, is pressed at 210° C./20 Bars, having the following characteristics:

| Physical Property | Method | Unit | Value |
| --- | --- | --- | --- |
| Tensile strength at break | ISO 37 [1] | [MPa] | 8.5 |
| Elongation at break | ISO 37 [1] | [%] | 810 |
| Melt Index (190° C./5 kg) | ISO 1872-1, No 18T | [g/10 min] | 0.8 |
| Shore hardness A | ISO 868 | — | 75 |
| Gel content | ISO 6427 | [%] | 32 |

[1] Pulling speed 50 mm/min

The above data show, that this specimen shows characteristics of a TPV. Further, the specimen is transparent and odourless.

EXAMPLE 1.4

| Ingredient | component | % |
| --- | --- | --- |
| Vistalon ™ 1703P EPDM ex ExxonMobil: Mooney Viscosity ML (1 + 4) @125° C. = 25 | rubber phase (a) | 75.00 |
| Eltex ™ P HF 100 | thermopl. phase (b) | 22.50 |
| DHBP | (d1) | 0.05 |
| Vinyltrimethoxysilane | (d1) | 1.45 |
| Maleic Anhydride | anhydride (c) | 1.00 |

The total amount of ingredients will be 50 gr by weighted according the example 1.1. Vistalon™ 1703P ethylene propylene diene terpolymer (EPDM) and Eltex™ P HF 100 are introduced in the mixing chamber and mixed until homogenisation. Vinyltrimethoxysilane/DHBP mixture are injected in the mixing chamber, after 5 minutes grafting/compounding time the Brabender Torque reached a value from 5 Nm. Maleic Anhydride is added in the mixing chamber, compounding time 10 minutes. The Brabender Torque value increased to 11 Nm after 6 minutes and dropped at 5 Nm which indicated that the cross-linking reaction has taken place. A moulded specimen, 1.5 mm thickness, is pressed at 210° C./20 Bars, having the following characteristics:

| Physical Property | Method | Unit | Value |
| --- | --- | --- | --- |
| Tensile strength at break | ISO 37 [1] | [ ]MPa | 8.5 |
| Elongation at break | ISO 37 [1] | [%] | 380 |
| Melt Index (190° C./5 kg) | ISO 1872-1, No 18T | [g/10 min] | 1.0 |
| Shore hardness A | ISO 868 | — | 82 |
| Gel content | ISO 6427 | [%] | 35 |

[1] Pulling speed 50 mm/min

The above data show, that this specimen shows characteristics of a TPV. Further, the specimen is transparent and odourless.

EXAMPLE 2

Silane Thermoplastic Vulcanised Elastomers, Sulphur Curable

The experiments were carried out on a Brabender Plasticorder having a mixing chamber from 50 CC and equipped with "Sigma" mixing knives. The setting temperature was 190° C. and mixing speed used was 120 RPM.

EXAMPLE 2.1

| Ingredient | component | % |
|---|---|---|
| NBR: Perbunan™ 3430F ex Lanxess Mooney Viscosity UML (1 + 4) at 100° C. = 32; Bound Acronitrile = 34 | rubber phase (a) | 75.00 |
| Eltex P HF 100 [2] | thermopl. phase (b) | 22.65 |
| Si 69 ™: Bis(triethoxysilylpropyl) polysulfide ex Degussa | (d2) | 1.95 |
| Maleic Anhydride | anhydride (c) | 0.40 |

The total amount of ingredients will be 50 gr by weighted according the example 1.1. Perbunan™ 3430F butadiene-acrylonitrile copolymer (NBR) and Eltex™ P HF 100 are introduced in the mixing chamber and mixed until homogenisation. Bis(triethoxysilylpropyl)polysulfide is injected in the mixing chamber, after 5 minutes grafting/compounding time the Brabender Torque reached a value from 7 Nm. Maleic Anhydride is added in the mixing chamber, compounding time 10 min. The Brabender Torque value increased to 15 Nm after 7 minutes and dropped at 7 Nm after 10 minutes, which indicated that, the cross-linking reaction has taken place. A moulded specimen, 1.5 mm thickness, is pressed at 210° C./20 bars, having the following characteristics:

| Physical Property | Method | Unit | Value |
|---|---|---|---|
| Tensile strength at break | ISO 37 [1] | [MPa] | 32 |
| Elongation at break | ISO 37 [1] | [%] | 650 |
| Melt Index (190° C./5 kg) | ISO 1872-1, No 18T | [g/10 min] | 0.4 |
| Shore hardness A | ISO 868 | — | 88 |
| Gel content | ISO 6427 | [%] | 33 |

[1] 50 mm/min pulling speed

The above data show, that this specimen shows characteristics of a TPV. Further, the specimen is oil resistant.

EXAMPLE 2.2

Comparison

| Ingredient | component | % |
|---|---|---|
| NBR: as ex. 2.1 | rubber phase (a) | 75.00 |
| Eltex ™ P HF 100 | thermopl. phase (b) | 22.65 |
| Si 69 ™ | | — |
| Maleic Anhydride | anhydride (c) | 0.40 |

The total amount of ingredients will be 50 gr by weighted according the example 2.1. Perbunan™ 3430F and Eltex™ P HF 100 are introduced in the mixing chamber and mixed until homogenisation. After 5 minutes grafting/compounding time the Brabender Torque reached a value from 7 Nm. Maleic Anhydride is added in the mixing chamber, compounding time 10 minutes. The Brabender Torque value increased to 7 Nm after 6 minutes and remains at 7 Nm, which indicated that, no cross-linking reaction has taken place. A moulded specimen, 1.5 mm thickness, is pressed at 210° C./20 bars, having the following characteristics:

| Physical Property | Method | Unit | Value |
|---|---|---|---|
| Tensile strength at break | ISO 37 [1] | [MPa] | 6 |
| Elongation at break | ISO 37 [1] | [%] | 450 |
| Melt Index (190° C./5 kg) | ISO 1872-1, No 18T | [g/10 min] | 7 |
| Shore hardness A | ISO 868 | — | 78 |
| Gel content | ISO 6427 | [%] | 0 |

[1] 50 mm/min pulling speed

The above data show that this specimen shows NOT the characteristics of a TPV.

The invention claimed is:

1. A thermoplastic vulcanisate (TPV) composition comprising the reaction product of
   (a) a first polymer (rubber phase);
   (b) a second polymer (thermoplastic phase);
   (c) a carboxylic acid anhydride;
   (d) either (d1) a vinyl-silane in combination with a peroxide or (d2) a sulphursilane;
   and whereby component (d) is first added to a polymer melt comprising components (a) and (b), followed by the addition of component (c).

2. The composition according to claim 1, wherein component (a) is a Polyethylene or an Ethylene-Propylene-Diene-Rubber.

3. The composition according to claim 1, wherein component (b) is a Polypropylene.

4. The composition according to claim 1, wherein component (c) is maleic acid anhydride.

5. The composition according to claim 1, wherein component (d1) is vinyltrimethoxy-silane in combination with 2,5-dimethyl-2,5-di(tert.butylperoxy) hexane (DHBP) or wherein component (d2) is Bis(triethoxy-silylpropyl) polysulfide.

6. The composition according to claim 1 wherein
   (a) is present in an amount of 50-90 wt %;
   (b) is present in an amount of 5-40 wt %;
   (c) is present in an amount of 0.2-5 wt %; and/or
   (d) is present in an amount of 0.2-5 wt %;
   wherein the wt % is based on the total amount of polymer present.

7. The composition according to claim 1, wherein
   the gel content is 5-40 wt %; and/or
   the tensile strength is 3-40 MPa; and/or
   the elongation break is 100-1500%; and/or
   the melt index is 0.1-20 g/10 min at 190° C./5 kg; and/or
   the shore hardness is 20 A-80 D.

8. The composition according to claim 1, wherein
   component (d) is selected from (d1),
   component (a) is selected from the group consisting of ethylene propylene copolymer (EPR), ethylene propylene diene terpolymer (EPDM), butyl rubber (BR), natural rubber (NR), chlorinated polyethylenes (CPE), isoprene rubber (IR), silicone rubber, chlorinated rubbers, styrene-butadiene rubber (SBR), nitrile rubber (NBR), ethylene-vinyl acetate (EVA), ethylene methacrylate (EMA), ethylene butylacrylate (EBA), ethylene ethylacrylate (EEA), low density polyethylene (LDPE), medium density polyethylene (MDPE), high density polyethylene (HDPE), very low density polyethylene (VLDPE), ultra low density polyethylene (ULDPE) and
   component (b) is selected from the group consisting of polypropylene and its copolymers, thermoplastic polyolefins (TPO's), thermoplastic polypropylene, polyethylene and its copolymers, silane copolymers, polystyrene (PS), acrylonitrile butadiene styrene (ABS), styrene acrylonitrile (SAN), polymethylmethacrylate (PMMA), polyethylene terephthalate (PET), polybutyleneterephthalate (PBT), polycarbonate (PC), and polyamide (PA).

9. The composition according to claim 1, wherein component (d) is selected from (d2),
component (a) is selected from the group consisting of EPR, EPDM, BR, NR, CPE, IR, SBR, NBR, chlorinated rubbers and PVC ethylene propylene copolymer (EPR), ethylene propylene diene terpolymer (EPDM), butyl rubber (BR), natural rubber (NR), chlorinated polyethylenes (CPE), isoprene rubber (IR), styrene-butadiene rubber (SBR), nitrile rubber (NBR), chlorinated rubbers and polyvinyl chloride (PVC); and
component (b) is selected from the group consisting of polypropylene and its copolymers, polyethylene and its copolymers, polystyrene (PS), acrylonitrile butadiene styrene (ABS), styrene acrylonitrile (SAN), polymethylmethacrylate (PMMA), thermoplastic polyesters (PET, PBT), polycarbonate (PC), and polyamide (PA).

10. A process for manufacturing a composition according to claim 1, said process comprising the steps of:
method A, where component (d1) is used:
proving a homogeneous mixture of components (a) and (b), and then
adding component (d1), either simultaneously or subsequently and then
adding component (c); or
method (B), where component (d2) is used:
proving a homogeneous mixture of components (a) and (b) and then
adding component (d2), and then
adding component (c).

11. The process of claim 10 method (A), wherein the vinylsilane is added first, followed by addition of the peroxide.

12. An article consisting of a composition according to claim 1, said article being selected from the group of pipes, profiles, molded parts, foamed parts and sheet-like articles.

13. An automotive device consisting of a composition according to claim 1.

14. An aircraft device consisting of a composition according to claim 1.

15. A healthcare device consisting of a composition according to claim 1.

16. A power cable comprising a composition according to claim 1.

* * * * *